(12) United States Patent
Fernández Lazo et al.

(10) Patent No.: US 10,946,836 B2
(45) Date of Patent: Mar. 16, 2021

(54) WINDSCREEN WIPER DEVICE FOR WINDSCREENS WITH VARIABLE CURVATURE

(71) Applicant: DOGA, S.A., Abrera (ES)

(72) Inventors: Juan Fernández Lazo, Abrera (ES); Juan José García Chica, Abrera (ES); Sergi Sánchez Elvira, Abrera (ES)

(73) Assignee: DOGA, S.A., Abrera (ES)

( * ) Notice: Subject to any disclaimer, the term of this patent is extended or adjusted under 35 U.S.C. 154(b) by 255 days.

(21) Appl. No.: 16/183,294

(22) Filed: Nov. 7, 2018

(65) Prior Publication Data

US 2019/0135233 A1    May 9, 2019

(30) Foreign Application Priority Data

Nov. 7, 2017  (EP) .................................... 17382743

(51) Int. Cl.
*B60S 1/24*    (2006.01)
*B60S 1/34*    (2006.01)
*B60S 1/08*    (2006.01)

(52) U.S. Cl.
CPC . *B60S 1/24* (2013.01); *B60S 1/08* (2013.01); *B60S 1/3495* (2013.01); *B60S 1/3486* (2013.01); *B60S 1/3493* (2013.01)

(58) Field of Classification Search
CPC ........ B60S 1/3418; B60S 1/08; B60S 1/3486; B60S 1/3495; B60S 1/24; B60S 1/3493; B60S 1/3443
USPC ................. 15/250.21, 250.23, 250.22, 250.3
See application file for complete search history.

(56) References Cited

U.S. PATENT DOCUMENTS

| 4,791,698 A | * | 12/1988 | Murata | .................. | B60S 1/163 |
| | | | | | 15/250.13 |
| 5,012,525 A | * | 5/1991 | Kuhbauch | ............... | B60S 1/163 |
| | | | | | 15/250.13 |
| 5,186,064 A | | 2/1993 | Matsumoto et al. | | |
| 5,890,256 A | | 4/1999 | Eustache | | |

FOREIGN PATENT DOCUMENTS

| FR | 2740749 | | 5/1997 |
| GB | 753679 | * | 7/1956 |

* cited by examiner

*Primary Examiner* — Gary K. Graham
(74) *Attorney, Agent, or Firm* — Julie K. Staple; Dinsmore & Shohl LLP

(57) ABSTRACT

Windscreen wiper device for windscreens with variable curvature, comprising a secondary shaft rotating about its secondary axis between starting and final secondary positions, and a primary shaft on which the wiper blade arm is mounted rotating in an alternating manner about its own primary axis between starting and final primary positions. The primary shaft is mounted in the secondary shaft, such that their corresponding axes form a first acute angle (β) with respect to one another. The device further comprises a delay device kinematically connecting the driving means with the secondary shaft to cause rotation in the secondary shaft such that when the primary shaft has performed 50% of the rotation between the starting primary position and the final primary position, the secondary shaft has performed between 0% and 30% of the rotation between the starting secondary position and said final secondary position.

11 Claims, 8 Drawing Sheets

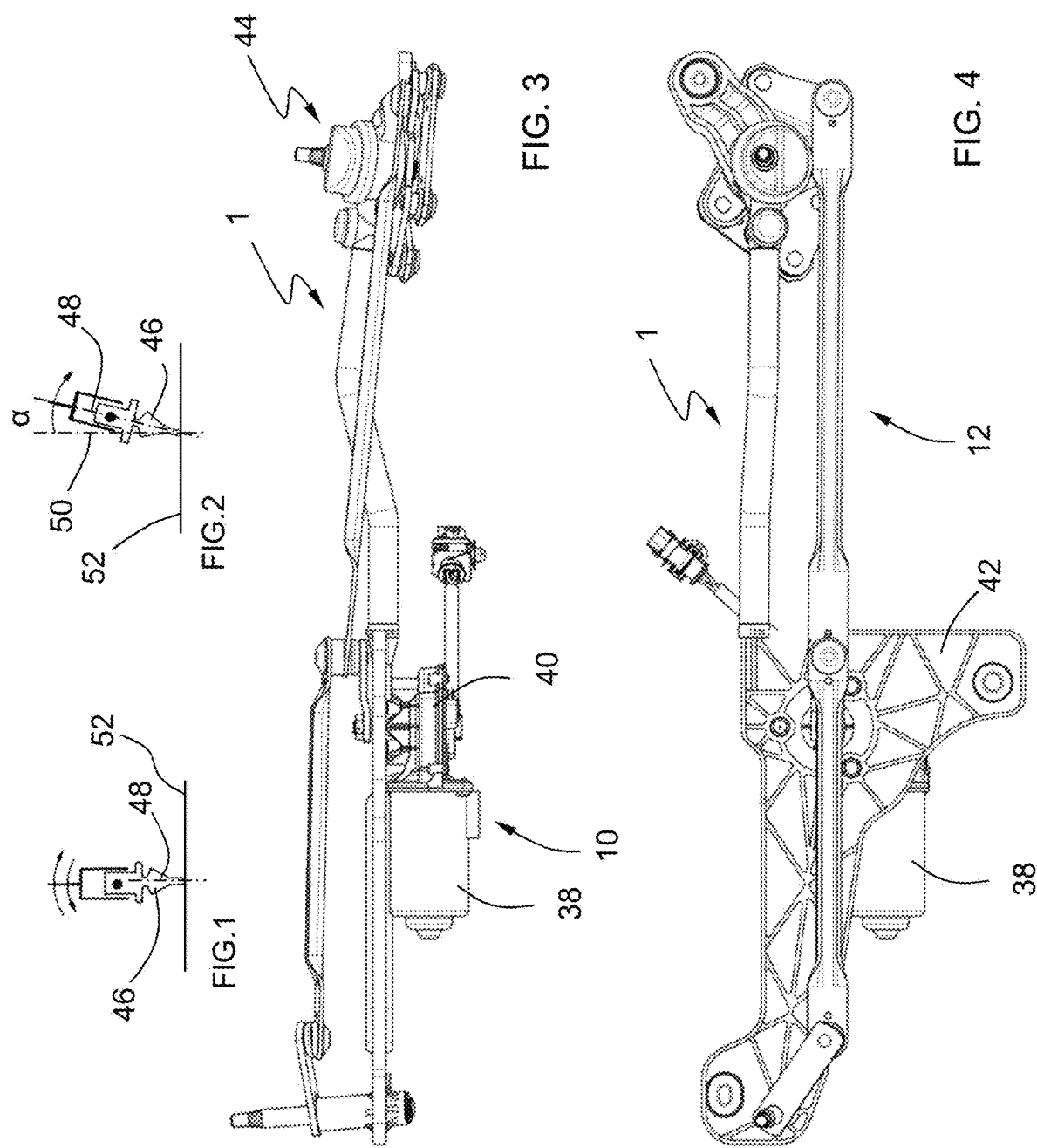

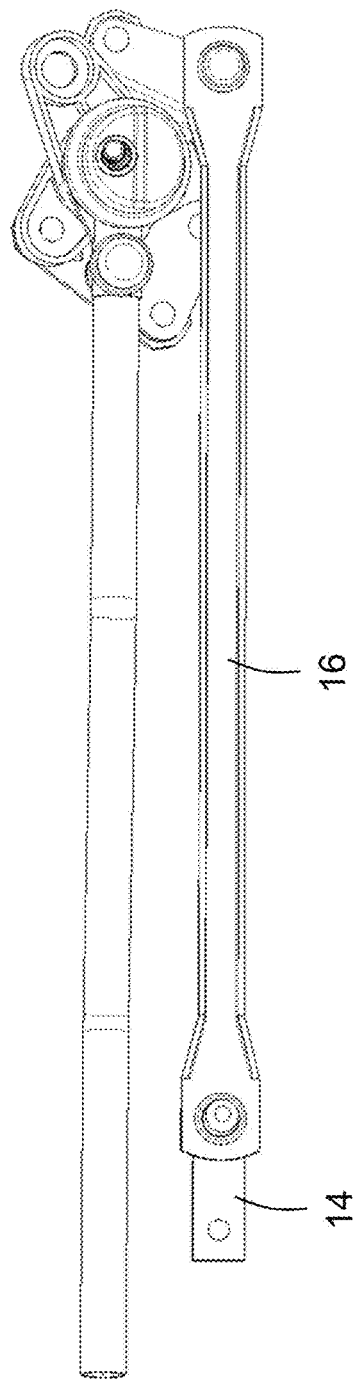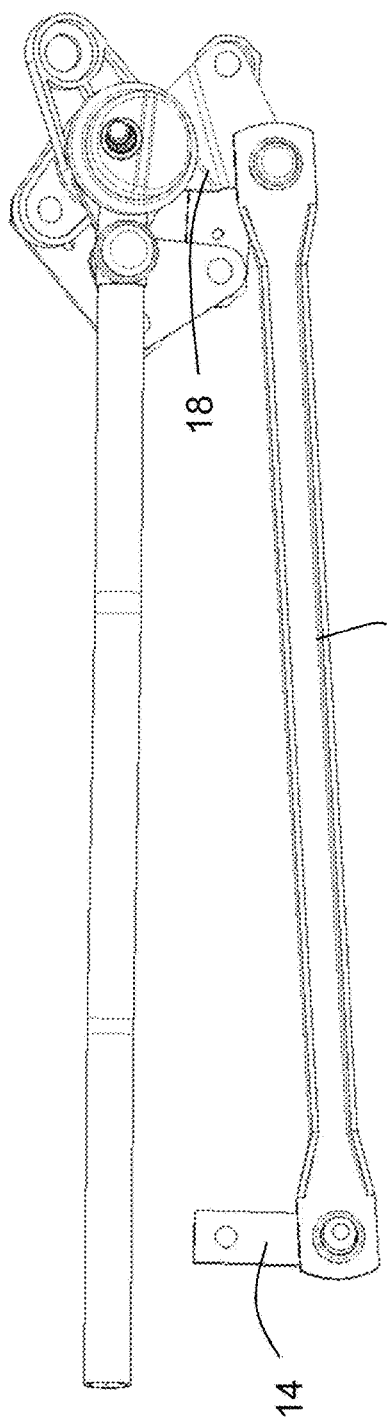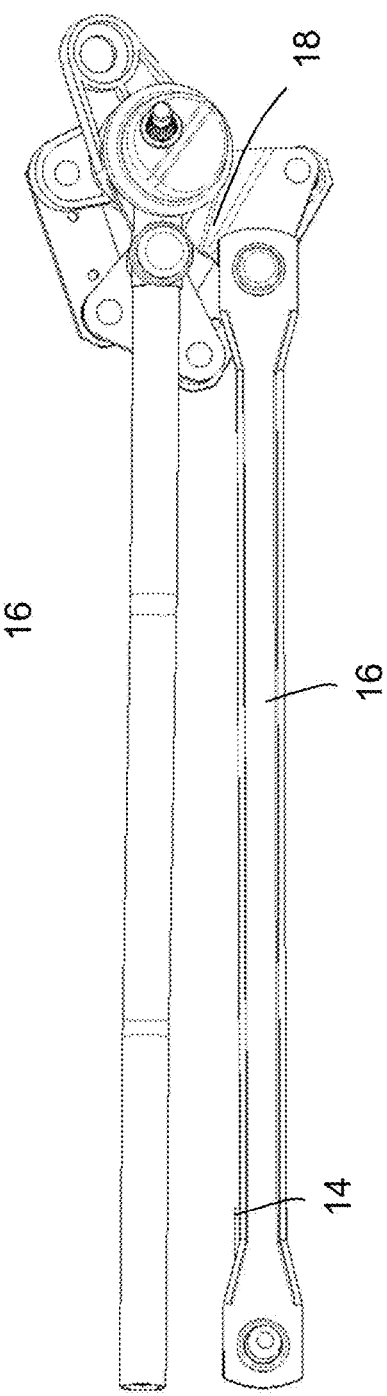

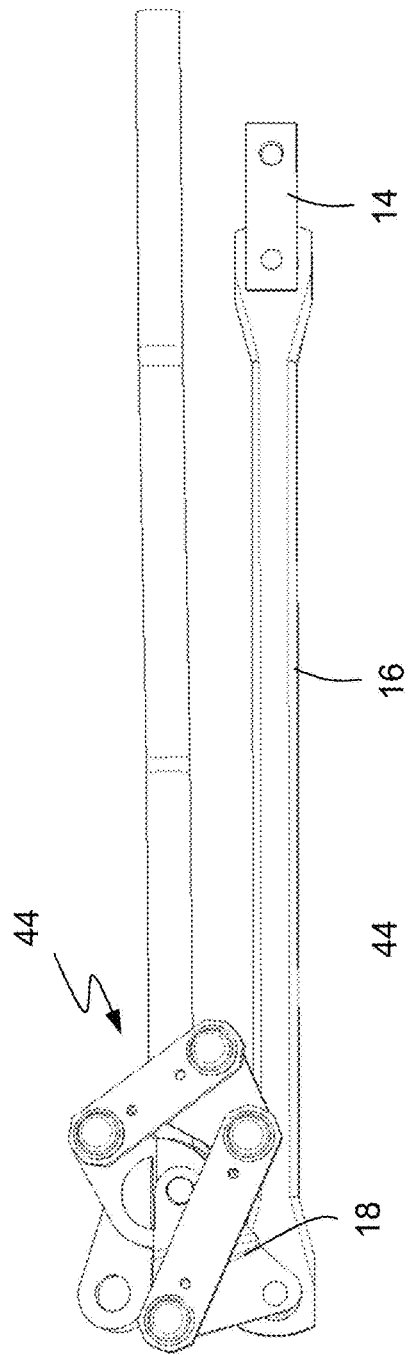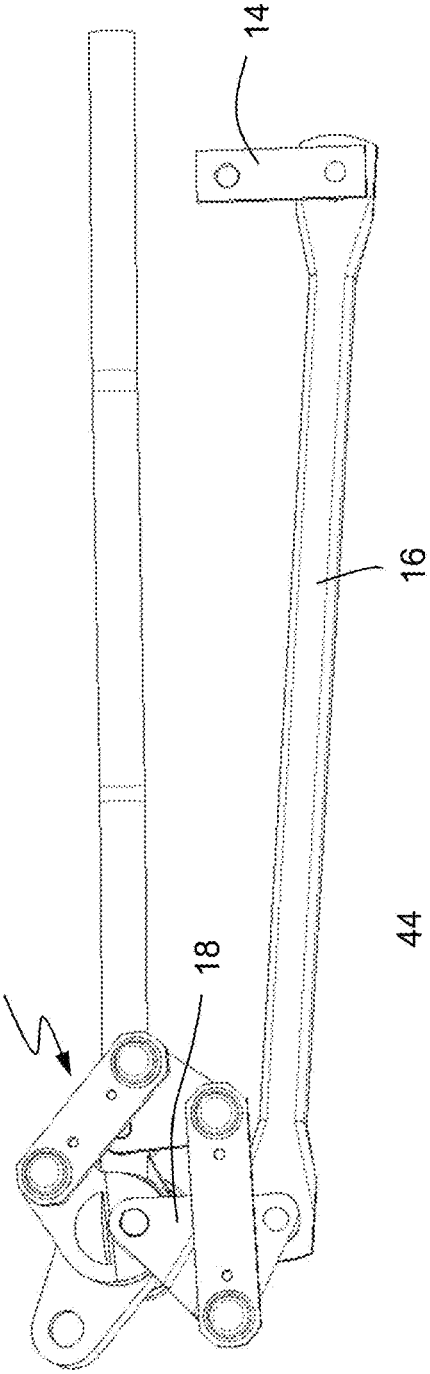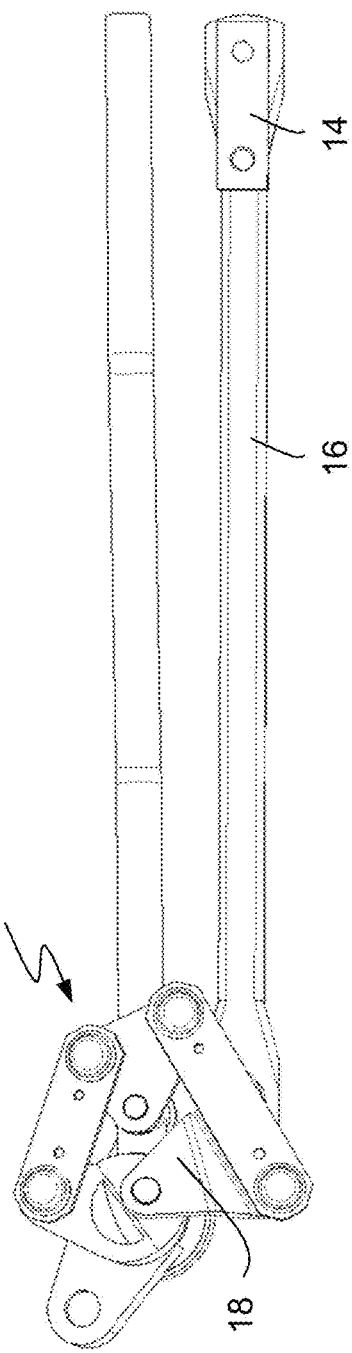

WINDSCREEN WIPER DEVICE FOR WINDSCREENS WITH VARIABLE CURVATURE

REFERENCE TO RELATED APPLICATION

This application claims priority to European patent application No. EP17382743.7, filed Nov. 7, 2017, the entire content of which is incorporated herein by reference.

FIELD OF THE INVENTION

The invention relates to a windscreen wiper device for windscreens with variable curvature, comprising: a secondary shaft rotating about its own secondary axis, and a primary shaft rotating in an alternating manner about its own primary axis by driving means of said windscreen wiper device between a starting position and a final position, and said primary shaft being mounted in said secondary shaft, such that said primary axis is inclined with respect to said secondary axis forming a first acute angle with respect to one another, a wiper blade arm being fixedly mounted on said primary shaft, such that said wiper blade arm is also moved in an alternating, manner with respect to said windscreen through said primary shaft.

BACKGROUND OF THE INVENTION

In recent years, vehicle manufacturers have been creating windscreen designs that give priority to safety, visibility, aerodynamic shapes and low consumption. These requirements lead to windscreens with curved geometries that are hard to clean by means of conventional windscreen wiper devices.

Particularly, when cleaning glazed surfaces of curved windscreens, it is especially important to attain a suitable angle of incidence of the wiper blade on the surface of the windscreen. In the art, the angle of incidence formed by the wiper blade with respect to the windscreen is also known as the angle of attack. The angle of attack $\alpha$ is schematically shown in FIGS. 1 and 2. Angle of attack $\alpha$ is understood to be the angle comprised between the axis of symmetry 48 of the cross-section of the cleaning lip 46 of the wiper blade and the normal 50 to the surface of the windscreen 52, at any point of its cleaning, path.

There are windscreen types like those described above that are characterized by having a central area that is substantially planar or has such a slight curvature that it is virtually imperceptible, although, in contrast, the curvature at the side ends thereof increases very significantly. In these conditions, an unsuitable angle of attack of the wiper blade on the curved area of the side ends affects the equipment sweeping efficiency and durability.

The optimum angle of attack $\alpha$ is the angle forming approximately 0° between the axis of symmetry 48 of the cross-section of the cleaning lip 46 of the wiper blade and the normal 50 to the surface of the windscreen 52. It is known that an unsuitable angle of attack results in noises, the wiper blade skipping over the surface of the windscreen, an inadequate cleaning and premature wear affecting the windscreen wiper equipment as a whole. The larger the dimensions of the windscreen, the more prominent the problem will be.

Some solutions have been considered in the state of the art for solving the mentioned problems.

Document U.S. Pat. No. 5,186,064 A discloses a windscreen wiper device for curved windscreens, in which an angle-of-attack compensation device is incorporated. The device has a primary supporting shaft for supporting the wiper blade. This primary shaft is mounted on a second pivot shaft such that it can also pivot in order to modify the angle of attack of the wiper blade. Nevertheless, this device is only intended for cleaning windscreens with a constant curvature. It is therefore not suitable for cleaning windscreens with variable curvature, particularly in the side areas of the windscreen.

SUMMARY OF THE INVENTION

It is an object of the invention to provide a windscreen wiper device of the type indicated above, which allows compensating for the angle of attack of the wiper blade for effectively cleaning windscreens with variable curvature along the entire path of the wiper blade. This device is particularly intended for windscreens in which the most pronounced curvature starts in the final part of the path of at least one of the wiper blades. Furthermore, as a result of the compensation of the angle of attack, this device reduces the noises of the wiper blade along its entire path and prevents premature wear.

This purpose is achieved by means of a windscreen wiper device of the type indicated above, characterized in that it further comprises a delay device kinematically connecting said driving means with said secondary shaft to cause rotation in said secondary shaft such that when said primary shaft has performed 50% of the rotation between said starting primary position and said final primary position, said secondary shaft has performed between 0% and 30% of the rotation between said starting secondary position and said final secondary position.

In the invention, the "starting primary position" of the primary shaft and the "starting secondary position" of the secondary shaft refer, respectively, to the angular positions of these two shafts when the windscreen wiper is on standby before starting the movement of cleaning the windscreen of the vehicle.

On the other hand, the "final primary position" of the primary shaft and the "final secondary position" of the secondary shaft refer, respectively, to the angular positions of these shafts when the windscreen wiper is in the end position for cleaning the windscreen of the vehicle. So, the wiper blades starts to move back from this final position to the standby position, i.e., the starting primary and secondary positions.

The advantage of the device according to the invention consists of combining the assembly of the primary shaft in the secondary shaft with the relative inclination of their respective axes, forming a first acute angle to compensate for the angle of attack, together with the application of the delay device, kinematically connecting the primary and secondary shafts. As already been discussed, the inclination between axes, combined with the rotation provided by the secondary shaft is responsible for optimizing the angle of attack of the wiper blade on the windscreen. On the other hand, the delay device allows the compensation of the angle of attack to be done is a non-linear manner with the rotation of the wiper blade arm. Therefore, variation in the angle of attack of the wiper blade in the first part of the cleaning path is very small and less than the variation of the angle of attack in the second part of the path of the wiper blade.

The adaptation of the angle of attack to the curvature of the windscreen with this delay therefore allows cleaning windscreens with a more pronounced curvature as the wiper blade moves closer to the sides of the windscreen. This prevents or at least significantly reduces the risk of the wiper blade skipping over the surface in the final parts of the cleaning path of the wiper blade. As a result of the elimination of the skipping, the windscreen is more efficiently cleaned in the entire path. Furthermore, since skipping does not occur, the wiper blade is subjected to much smaller mechanical stresses, such that this allows prolonging its service life.

The invention further includes a number of preferred features that are object of the dependent claims and the utility of which will be highlighted hereinafter in the detailed description of an embodiment of the invention.

In order to make the device as compact as possible, in a particularly preferred manner, the primary shaft is mounted concentrically inside the secondary shaft.

In a particularly preferred embodiment intended for cleaning windscreens, particularly windscreens that are flat in the central area thereof, when said primary shaft has performed 50% of the rotation between said starting primary position and said final primary position, said secondary shaft has performed between 5% and 23% of the rotation between said starting secondary position and said final secondary position. It has been proven that this ratio is particularly suitable for windscreens having large dimensions, such as those used in buses, for example.

In another embodiment intended for optimizing the cleaning of the final part of the windscreen wiper, particularly aerodynamic windscreen wipers, when said primary shaft has performed 75% of the rotation between said starting primary position and said final primary position, said secondary shaft has performed 65% of the rotation between said starting secondary position and said final secondary position.

In an embodiment intended for proposing a robust and wear-resistant mechanism, said driving means comprise a motor and a first planar four-bar linkage driven by said motor, said first four-bar linkage being formed by:
 [a] first driving bar,
 [b] a first transmission bar and
 [c] a first driven bar, said first driven bar being mounted such that it swivels about said primary axis and being connected to said primary shaft to drive said primary shaft in an alternating manner, in that
said delay device comprises second and third planar tourharp linkages, said second four-bar linkage being thrilled by
 [d] a second driving bar, said second driving bar being mounted such that it swivels about said primary axis and is kinematically connected to said first driven bar, forming a second angle with respect to one another, so that hey can move as a unit
 [e] a second transmission bar and
 [f] a second driven bar, said second driven bar being mounted such that it swivels about a fixed swivel axis, and said third four-bar linkage being formed by:
 [g] a third driving bar, said third driving bar being mounted such that it swivels about said swivel axis and being kinematically connected to said second driven bar, forming a third angle with respect to one another, so that they can move as a unit
 [h] a third transmission bar and
 [i] a third driven bar, said third driven bar being mounted such that it swivels about said secondary axis and being connected to said secondary shaft to drive said secondary shaft in an alternating manner, and in that in the starting position of said windscreen wiper, said third driving bar and said third transmission bar are arranged forming a fourth angle comprised between −5° and +20° with respect to one another. Another advantage of mechanisms of this type is their good adaptability to assembly tolerances. Furthermore, the negative angle allows significantly increasing the delay without backward movement of the mechanism actually being noted. In fact, the plays of the device itself make the negative angle imperceptible.

In the invention, a planar four-bar linkage refers to a four-bar linkage that performs a movement on a plane going through all the articulation points of the mechanism. As it is known by the person skilled in the art, one of the four bars in a four-bar linkage is the bar defined by the two points of the mechanism that do not move.

In a particularly preferred manner, in order to maximize the delay in the rotation of the secondary shaft in said starting position of said windscreen wiper, said third driving bar and said third transmission bar are arranged forming a fourth angle comprised between −5° and +10° with respect to one another.

In another embodiment, said second angle between the second driving bar and said first driven bar is comprised between 35° and 55°, and said third angle between said third driving bar and said second driven bar is comprised between 55° and 75°. This thereby results in an effective and compact mechanism.

In another embodiment, said first four-bar linkage is a crank-rocker-type anise as said second and third four-bar linkages are double rocker-type mechanisms.

In an four-bar linkage-type mechanism, a crank-rocker mechanism is that mechanism in which one of the bars (a drive or driven bar) with an end hinged to a fixed point can perform a complete rotation, whereas the other (drive or driven) bar hinged at one end to a fixed point only swivels.

Likewise, a double rocker mechanism is that mechanism in which the two bars with one of the ends hinged at a fixed point only swivel.

In a particularly preferred embodiment, the length ratio between said second driving bar and said second transmission bar is comprised between 0.5 and 0.7, between said second driving bar and said second driven bar is comprised between 1.1 and 1.3, and between said second driving bar and the distance between said primary axis and said swivel axis is comprised between 1.1 and 1.3, whereas the length ratio between said third driving bar and said third transmission bar is comprised between 0.4 and 0.6, and between said second driving bar and said second driven bar is comprised between 0.7 and 0.9, between said second driving bar and the distance between said swivel axis and said secondary axis is comprised between 0.6 and 0.8.

In an embodiment which aims to make manufacturing simpler, in a particularly preferred manner said primary axis and said secondary axis are coplanar.

Another purpose considered by the invention consists of providing the smoothest possible movement of the device. To that end, in a particularly preferred embodiment, the primary axis is inclined with respect to said secondary axis forming said first acute angle with respect to one another, where said first acute angle is comprised between 12° and 32°.

Likewise, the invention also includes other features of detail illustrated in the detailed description of an embodiment of the invention and in the accompanying figures.

BRIEF DESCRIPTION OF THE DRAWINGS

Further advantages and features of the invention will become apparent from the following description, in which, without any limiting character, preferred embodiments of the invention are disclosed, with reference to the accompanying drawings in which:

FIG. 1 shows a cross-section of a wiper blade of a windscreen wiper, showing an angle of attack of 0°.

FIG. 2 shows a cross-section of the wiper blade of FIG. 1 with an angle of attack other than 0°.

FIG. 3 shows a bottom plan view of a windscreen wiper device for windscreens with variable curvature according to the invention.

FIG. 4 shows a front view of the device of FIG. 3.

FIGS. 9A to 9C show partial front views of the device of FIG. 3 with the driving bar in the 0°, 90° and 180° positions, respectively.

FIGS. 10A to 10C show partial rear views of the device of FIG. 3 with the driving bar in the 0°, 90° and 180° positions, respectively.

DETAILED DESCRIPTION OF THE INVENTION

Figure 5:
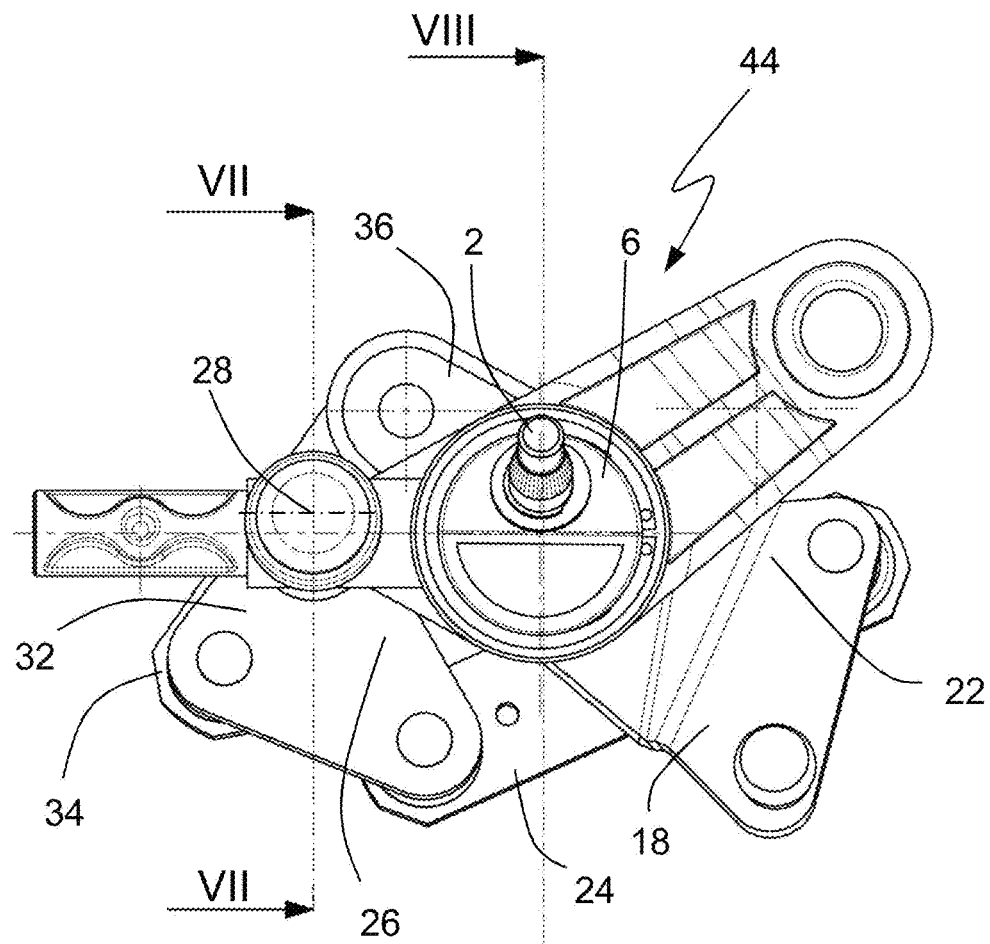
FIG. 5 shows a detailed front view of the area of the wiper blade provided with an arrangement for compensating for the angle of attack of the device of FIG. 3.
Figure 6:
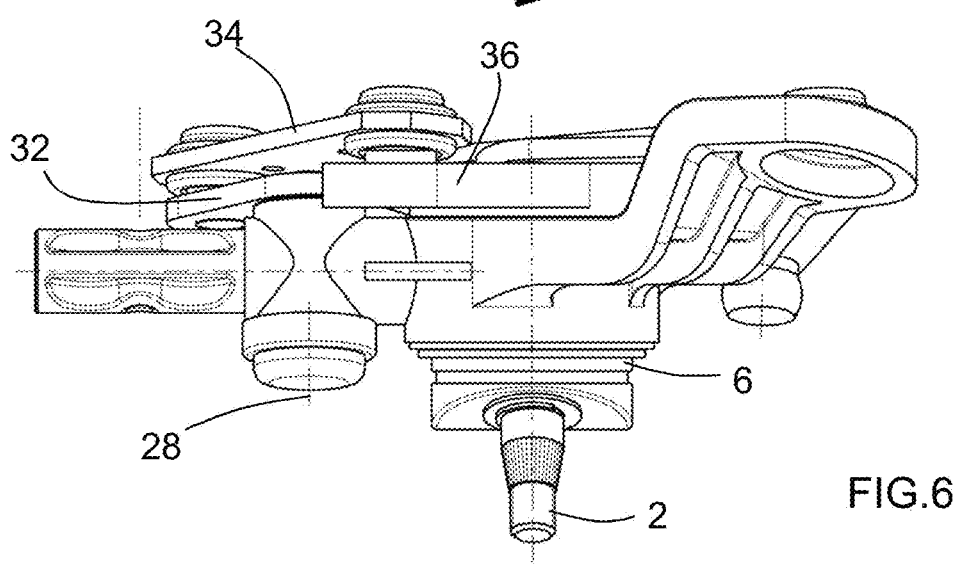
FIG. 6 shows a detailed top plan view of the area of the wiper blade with the arrangement for compensating for the angle of attack of the device of FIG. 3.
Figure 7:
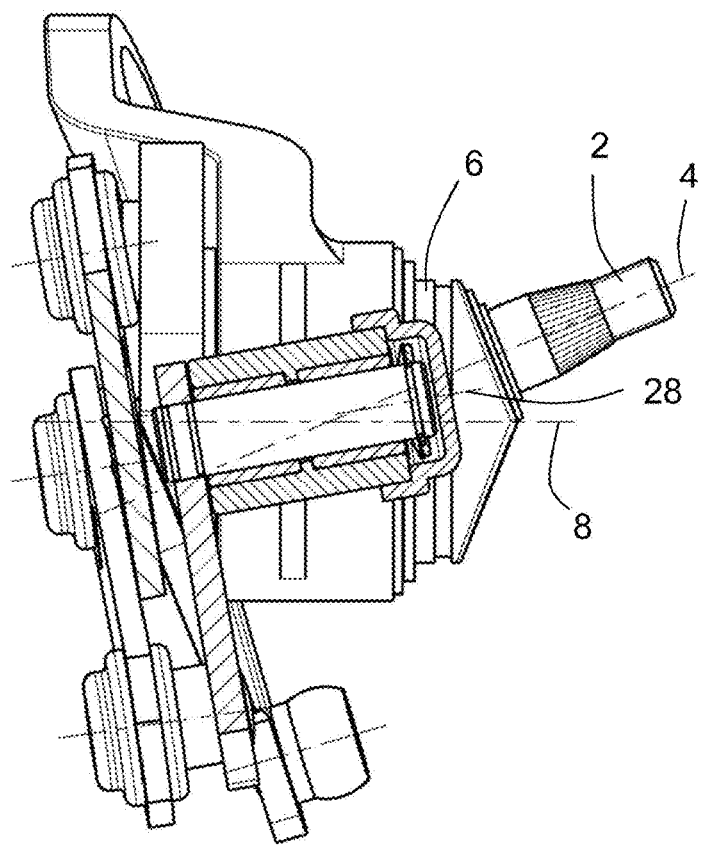
FIG. 7 shows a view sectioned along plane VII-VII of FIG. 5.

FIGS. 3 to 12C show an embodiment of the windscreen wiper device 1 for windscreens with variable curvature according to the invention.

The device 1 of this embodiment consists of a windscreen wiper device having two wiper blades with an angle-of-attack compensation system for one of the wiper blades.

The device 1 generally has main driving means 10 consisting of a motor 38, equipped with a gear drive 40, the motor 38 being mounted on a support 42 fixed to the chassis of the vehicle.

The motor 38 is responsible for driving both wiper blade arms in a known manner. The wiper blade arms, and accordingly the wiper blades, are not shown in the drawings.

Besides the motor 38, the driving means 10 have a first planar four-bar linkage 12 driven by the motor 38 itself. This first four-bar linkage 12, which is similar for both wiper blade arms, is formed by a first driving bar 14 connected to the output of the gear drive 40, a first transmission bar 16 and a first driven bar 18. The first driving bar 14 rotates 360° continuously driven by the motor 38. The rotation of the first driving bar 14 is transmitted to the first, driven bar 18 through the first transmission bar 16. The first driven bar 18 is mounted such that it swivels about a primary axis 4 and is connected to a primary shaft 2 to drive this primary shaft 2 in an alternating manner. This primary shaft 2 is precisely the one responsible for supporting the wiper blade arm, not shown in the drawings.

The first four-bar linkage 12 is a crank-rocker-type mechanism. This type of mechanism is widely known in the field of windscreen wipers and therefore does not have to be described in more detail.

The device 1 also has a secondary shaft 6 which is mounted to rotate about its own secondary axis 8 between a starting secondary position, shown in FIGS. 9A, 10A, 11 and 12A, and a final secondary position, shown in FIGS. 9C, 10C, 11C and 12C.

Figure 8:
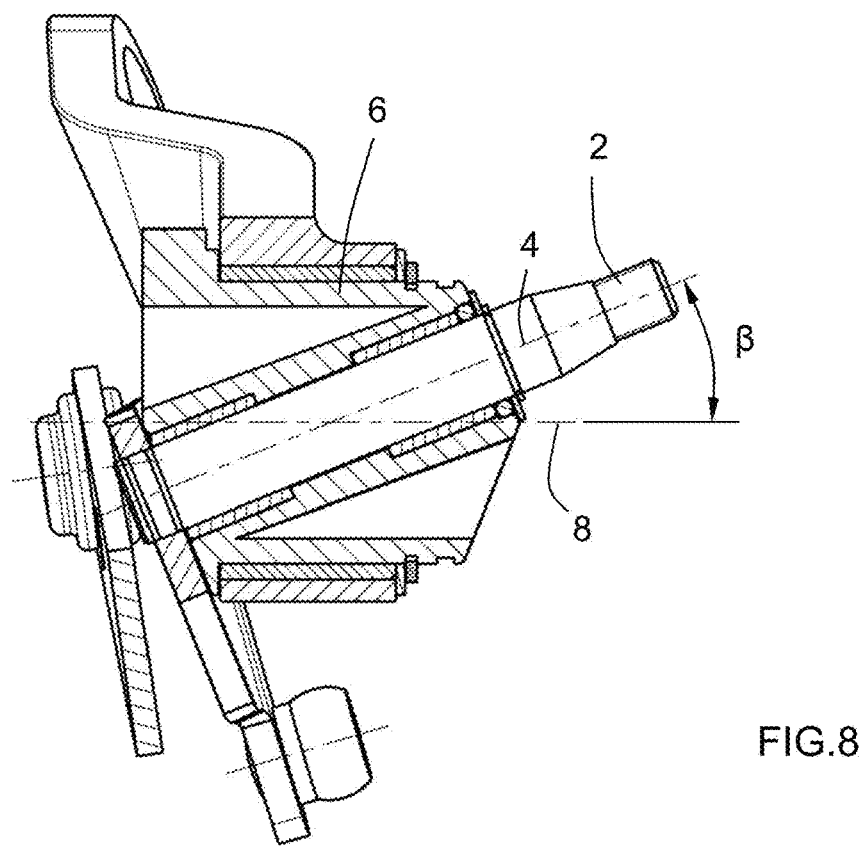
FIG. 8 shows a view sectioned along plane VIII-VIII of FIG. 5.
Figure 11A:
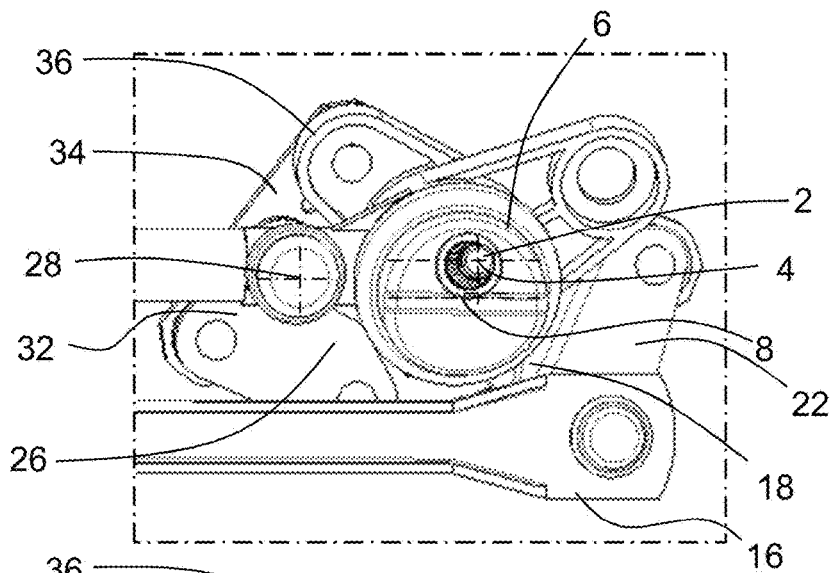
FIGS. 11A to 11C shows detailed front views of the device of FIG. 3 with the drive crank in the 0°, 90° and 180° positions, respectively.
Figure 11B:
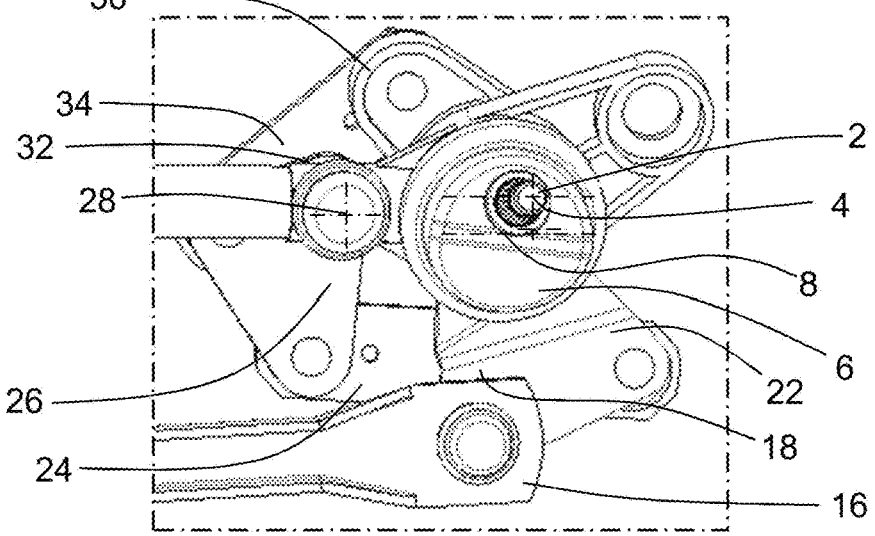
Figure 11C:
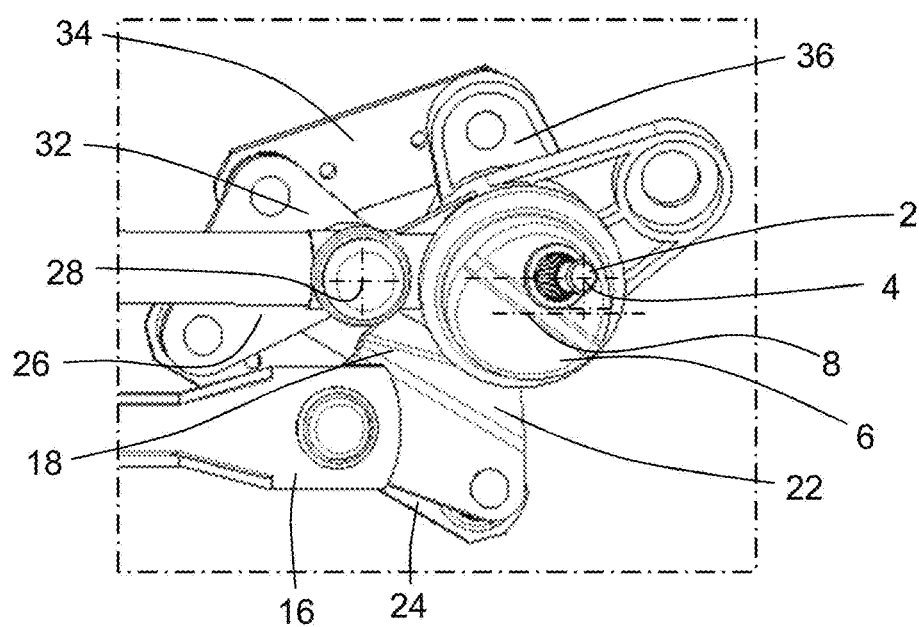

As seen in FIG. 8, the primary shaft 2 on which the wiper blade arm is mounted in the secondary shaft 6, inclined with respect to the secondary axis 8, such that the primary axis 4 is inclined with respect to the secondary axis 8, forming a first acute angle β with respect to one another. More particularly, the primary and secondary axes 4, 8 are coplanar. In a particularly preferred manner, the first acute angle β is comprised between 12° and 32°. Particularly, in this preferred embodiment the first acute angle β between the primary and secondary axes is 22°.

By means of the driving means 10, and accordingly the action of the first driven bar 18, the primary shaft 2 can rotate in an alternating manner about its own primary axis 4 between a starting primary position shown in FIGS. 9A, 10A, 11A and 12A, and a final primary position, shown in FIGS. 9C, 10C, 11C and 12C. The starting primary position corresponds to the position of the primary shaft 2 when the windscreen wiper is on standby, before starting the movement of cleaning the windscreen of the vehicle. In turn, the final primary position corresponds to the angular position of the primary shaft 2 when the windscreen wiper is in the end position for cleaning the windscreen of the vehicle.

As has already been discussed, the corresponding wiper blade arms mounted on the primary shaft 2, such that this wiper blade arm is also moved in an alternating manner with respect to the windscreen through the primary shaft 2.

In order to provide a windscreen wiper device 1 with an angle-of-attack compensation system which allows effectively cleaning windscreens with variable curvature in the entire path of the wiper blade, and particularly in the case of windscreens with greater curvature at the ends, the invention provides a delay device 44 kinematically connecting the driving means 10 with the secondary shaft 6 so that they can move as a unit. In this case, the windscreen wiper device of the drawings only incorporates a single delay device 44. Alternatively, the windscreen wiper device can have one delay device 44 for each of the wiper blades.

In this preferred embodiment, this delay device 44 comprises second and third planar four-bar linkages 20, 30. These second and third four-bar linkages 20, 30 are double rocker-type mechanisms.

The second four-bar linkage 20 is therefore formed by a second 60 mm-long driving bar 22. The second driving bar 22 is mounted such that it swivels about the primary axis 4 and is kinematically connected to the first driven bar 18, forming a second angle θ1 of 45° with respect to one another, so that they can move as a unit. The second mechanism also has a second 100 mm-long transmission bar 24 and a second 50-mm driven bar 26. The second driven bar 26 is mounted such that it swivels about a fixed swivel axis 28.

The third four-bar linkage 30 is formed by a third 32 mm-long driving bar 32, a third 70-mm transmission bar 34 and a third 40-mm driven bar 36. The third driving bar 32 is mounted such that it swivels about the swivel axis 28 and is kinematically connected to the second driven bar 26, forming a third angle θ2 of 67° with respect to one another, so that they can move as a unit. The third driven bar 36 is mounted such that it swivels about the secondary axis 8 and is connected to the secondary shaft 6 to drive the secondary shaft 6 in an alternating manner.

Figures 12A, 12B, 12C:
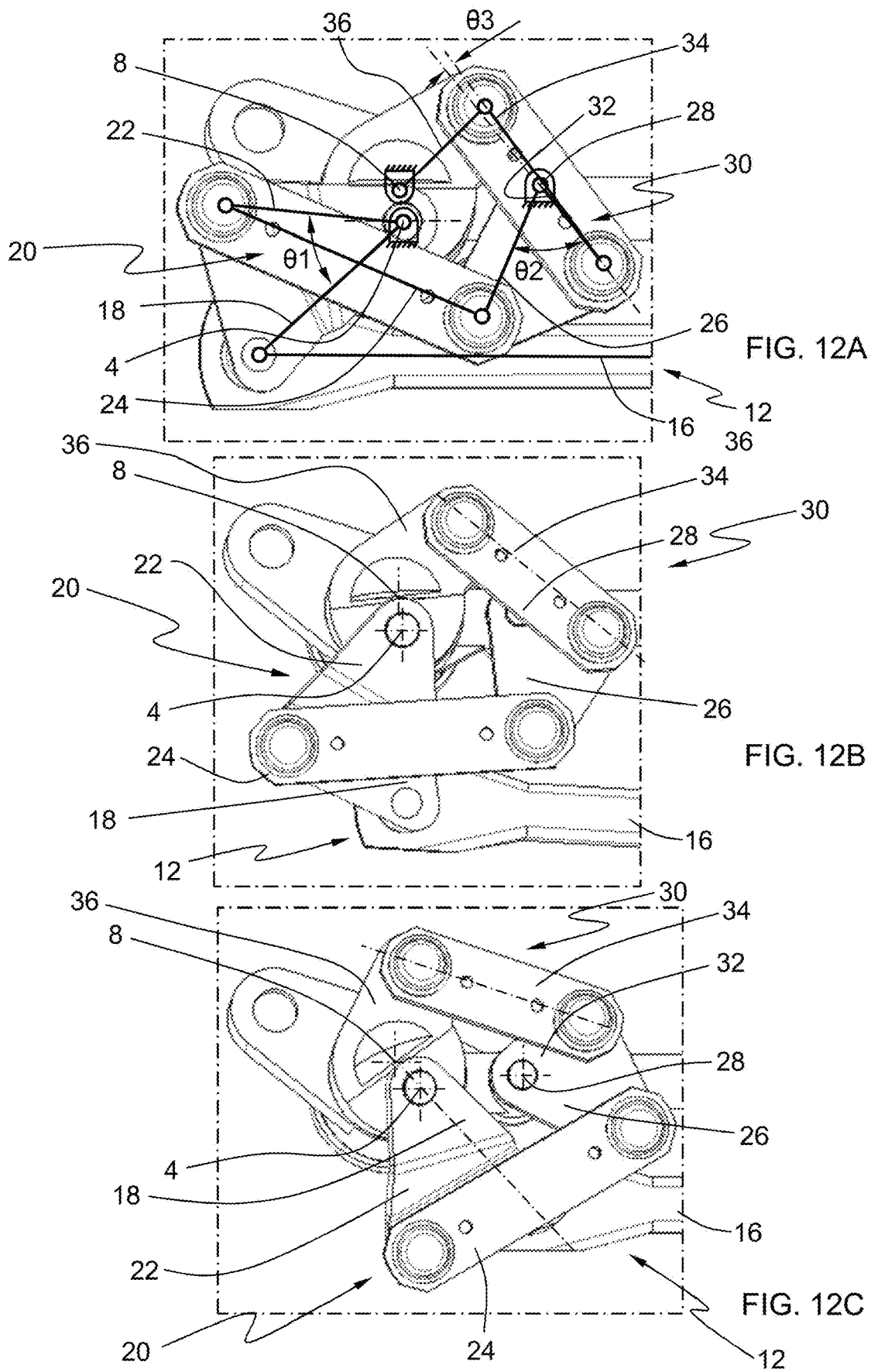
FIGS. 12A to 12C shows detailed rear views of the device of FIG. 3 with the drive crank in the 0°, 90° and 180° positions, respectively.

As seen in FIGS. 9A, 10A, 11A and 12A, in the starting position of the windscreen wiper, i.e., when the wiper blade arms are on standby, the third driving bar 32 and the third transmission bar 34 are arranged forming, a fourth angle θ3 comprised between −5° and +20° with respect to one another, and more preferably between −5° and 10°. Particularly, the angle θ3 shown in FIG. 12A is a positive angle.

The operation of the device according to the invention will be explained in more detail based on the following table. It must be pointed out that it is difficult to measure the angle of rotation of the primary shaft 2 for evaluating the percentage of rotation of this shaft, since in addition to rotating about its own primary axis 4, it also rotates as a result of the rotation of the secondary shaft 6, compensating for the angle of attack. Nevertheless, an indirect measurement of the percentage of rotation of the primary shaft 2 can be taken based on the angle of rotation of the axis of the motor 38 and of the first driving bar 14, as will be explained below.

The starting position of the windscreen wiper device 1 according to the invention is shown in FIGS. 9A, 10A, 11A and 12A. In this position, the primary shaft 2 is in the starting primary position corresponding to 0° of rotation of the first driving bar 14 and of the primary and secondary shafts 2, 6.

A table linking the percentage of rotation of the primary and secondary shafts 2, 6 measured based on the rotation of the secondary shaft 6 and the rotation of the drive shaft of the motor of the windscreen wiper is shown below.

| SWEEPING ANGLE of the primary Shaft 2 | ANGLE of the first drive bar 14 | ANGLE of the secondary shaft 6 | % OF ROTATION of the secondary shaft 6 | % OF ROTATION of the primary shaft 2 |
|---|---|---|---|---|
| 0 | 0 | 0 | 0.0 | 0.0 |
| 3 | 5 | 0 | 0.0 | 2.9 |
| 5 | 10 | 0 | 0.1 | 5.7 |
| 8 | 15 | 0 | 0.1 | 8.6 |
| 10 | 21 | 0 | 0.3 | 11.4 |
| 13 | 26 | 0 | 0.5 | 14.3 |
| 15 | 31 | 0 | 0.8 | 17.1 |
| 18 | 36 | 0 | 1.2 | 20.0 |
| 21 | 41 | 1 | 1.7 | 22.9 |
| 23 | 46 | 1 | 2.4 | 25.7 |
| 26 | 51 | 1 | 3.3 | 28.6 |
| 28 | 57 | 2 | 4.5 | 31.4 |
| 31 | 62 | 2 | 5.9 | 34.3 |
| 33 | 67 | 3 | 7.5 | 37.1 |
| 36 | 72 | 3 | 9.5 | 40.0 |
| 39 | 77 | 4 | 11.9 | 42.9 |
| 41 | 82 | 5 | 14.6 | 45.7 |
| 44 | 87 | 6 | 17.6 | 48.6 |
| 46 | 93 | 7 | 21.0 | 51.4 |
| 49 | 98 | 8 | 24.8 | 54.3 |
| 51 | 103 | 10 | 29.0 | 57.1 |
| 54 | 108 | 11 | 33.5 | 60.0 |
| 57 | 113 | 13 | 38.4 | 62.9 |
| 59 | 118 | 15 | 43.6 | 65.7 |
| 62 | 123 | 17 | 49.1 | 68.6 |
| 64 | 129 | 18 | 54.8 | 71.4 |
| 67 | 134 | 20 | 60.7 | 74.3 |
| 69 | 139 | 22 | 66.7 | 77.1 |
| 72 | 144 | 25 | 72.8 | 80.0 |
| 75 | 149 | 27 | 78.7 | 82.9 |
| 77 | 154 | 28 | 84.3 | 85.7 |
| 80 | 159 | 30 | 89.4 | 88.6 |
| 82 | 165 | 32 | 93.7 | 91.4 |
| 85 | 170 | 33 | 97.1 | 94.3 |
| 87 | 175 | 33 | 99.3 | 97.1 |
| 90 | 180 | 34 | 100.0 | 100.0 |

As seen in the preceding table, as a result of the delay device 44, when the motor 38 rotates the first driving bar 14 90° (see FIGS. 9B, 10B, 11B and 12B), the primary shaft has performed 50% of the rotation comprised between the starting, primary position and the final primary position. This 90° rotation is equivalent to a 45° rotation of the primary shaft 2. As a result of the delay device 44, the secondary shaft 6 performs rotation such that it has only performed a rotation between 6 and 7°. This rotation is equivalent to a percentage of rotation of the secondary shaft 6 between the starting secondary position and the final secondary position of about 19.3%.

On the other hand, when the primary shaft 2 has performed 75% of the rotation comprised between the starting primary position and the final primary position, which corresponds to an angle of a little over 67°, the secondary shaft performs a 21° rotation between the starting secondary position and the final secondary position, which is equivalent to a percentage of rotation of about 62.2%.

Figure 13:
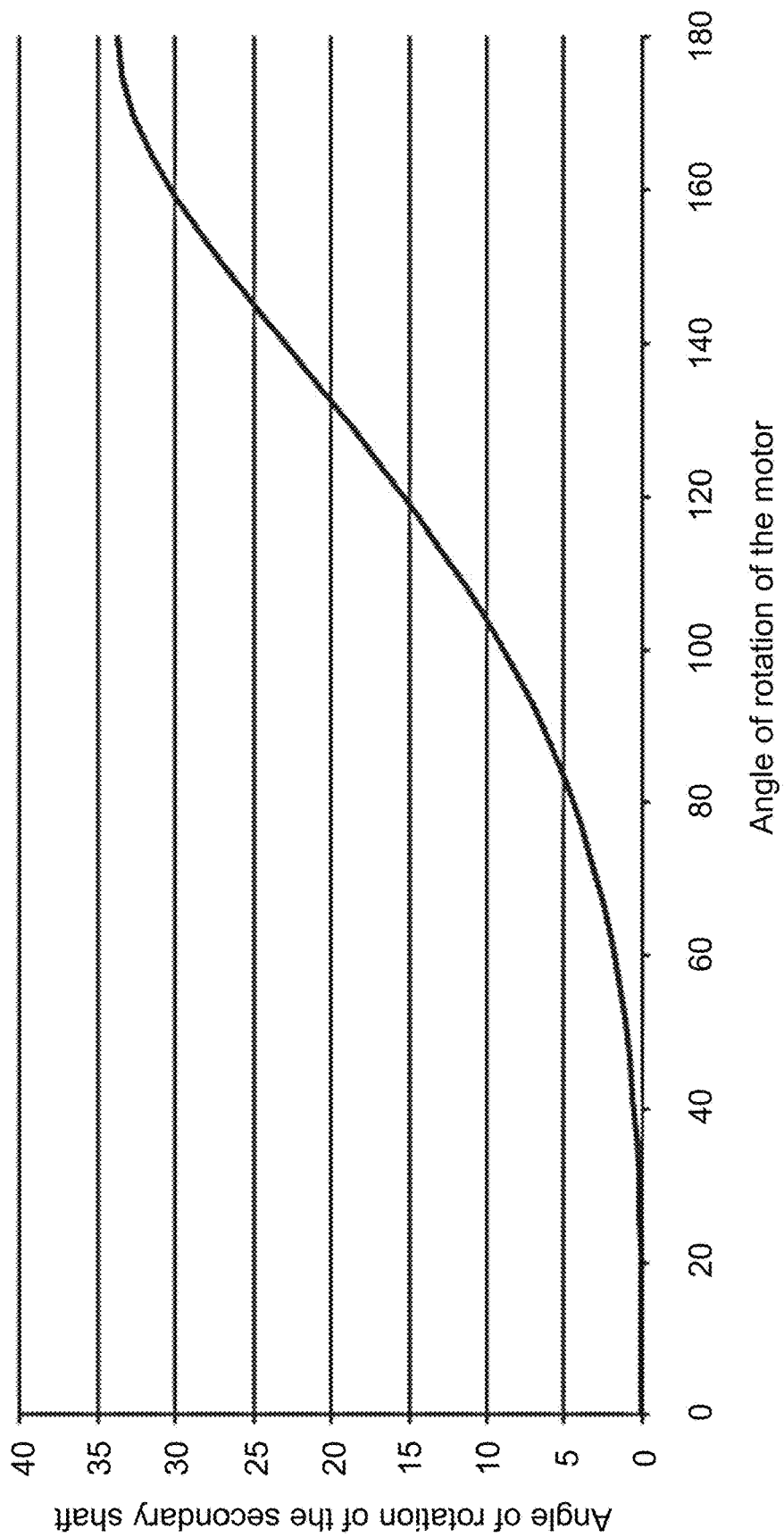
FIG. 13 shows a graph showing the evolution of the angle of rotation of the secondary shaft responsible for modifying the angle of attack of the wiper blade, with respect to the angle of rotation of the drive motor of the windscreen wiper device.

Accordingly, a large part of the modification of the angle of attack α of the wiper blade, obtained as a result of the rotation of the secondary shaft 6, is achieved in the second half of the path of the wiper blade arm, where a more advantageous operation is obtained in the case of windscreens with a significant change in curvature in the final section of the path. This operating principle is graphically shown in FIG. 13, which depicts the rotation ratio of the secondary shaft 6 with respect to the shaft of the motor 38, this being the angle that can be most easily measured and showing how the most important part of the rotation of the secondary shaft 6 responsible for causing the compensation of the angle of attack takes place after the primary shaft 2 has rotated 50%, whereby it adapts better to the geometry of the windscreens with larger curvatures at the side ends.

Finally, when the first driving bar 14 has rotated 180°, as depicted in FIGS. 9C, 10C, 11C and 12C, both the first and second shafts 2, 6 reach their respective primary and secondary final positions.

From this moment on, if the first driving bar 14 continues to rotate to complete the 360° turn, the backward movement of the wiper blade arms towards the starting position will begin.

In a particularly preferred manner, it must be stated that the optimum length ratio for solving the problem according to the invention is obtained when the ratio between the second driving bar 22 and the second transmission bar 24 is comprised between 0.5 and 0.7; when the ratio between the second driving bar 22 and the second driven bar 26 is comprised between 1.1 and 1.3; and when the ratio between the second driving bar 22 and the distance between the primary axis 4 and the swivel axis 28 is comprised between 1.1 and 1.3, more particularly the distance between the primary axis 4 and the swivel axis 28 in this example is 50 mm.

On the other hand, the optimum length ratio between the third driving bar 32 and the third transmission bar 34 is comprised between 0.4 and 0.6; the optimum length, ratio between the second driving bar 32 and the second driven bar 36 is comprised between 0.7 and 0.9; the optimum length ratio between the second driving bar 22 and the distance between the swivel axis 28 and the secondary shaft 8 is comprised between 0.6 and 0.8, more particularly, in this example the distance between the swivel axis 28 and the secondary shaft is 50 mm.

The invention claimed is:

1. A windscreen wiper device for windscreens with variable curvature, comprising:
    a secondary shaft rotating about its own secondary axis between a starting secondary position and a final secondary position, and
    a primary shaft rotating in an alternating manner about its own primary axis by driving means of said windscreen wiper device between a starting primary position and a final primary position, and said primary shaft being mounted in said secondary shaft, such that said primary axis is inclined with respect to said secondary axis forming a first acute angle (β) with respect to one another,
    a wiper blade arm being fixedly mounted on said primary shaft, such that said wiper blade arm is also moved in an alternating manner with respect to said windscreen through said primary shaft, characterized in that it further comprises a delay device kinematically connecting said driving means with said secondary shaft to cause rotation in said secondary shaft such that when said primary shaft has performed 50% of the rotation between said starting primary position and said final primary position, said secondary shaft has performed between 0% and 30% of the rotation between said starting secondary position and said final secondary position.

2. The windscreen wiper device according to claim 1, characterized in that when said primary shaft has performed 50% of the rotation between said starting primary position and said final primary position, said secondary shaft has performed between 5% and 23% of the rotation between said starting secondary position and said final secondary position.

3. The windscreen wiper device according to claim 1, characterized in that when said primary shaft has performed 75% of the rotation between said starting primary position and said final primary position, said secondary shaft has performed 65% of the rotation between said starting secondary position and said final secondary position.

4. The windscreen wiper device according to claim 1, characterized in that said driving means comprises a motor and a first planar four-bar linkage driven by said motor, said first four-bar linkage being formed by:
    a first driving bar,
    a first transmission bar and
    a first driven bar, said first driven bar being mounted such that it swivels about said primary axis and being connected to said primary shaft to drive said primary shaft in an alternating manner, in that said delay device comprises second and third planar four-bar linkages, said second four-bar linkage being formed by:
    a second driving bar, said second driving bar being, mounted such that it swivels about said primary axis and is kinematically connected to said first driven bar, forming a second angle (θ1) with respect to one another, so that they can move as a unit,
    a second transmission bar and
    a second driven bar, said second driven bar being mounted such that it swivels about a fixed swivel axis, and said third four-bar linkage being formed by:
    a third driving bar, said third driving bar being mounted such that it swivels about said swivel axis and being kinematically connected to said second driven bar, forming a third angle (θ2) with respect to one another, so that they can move as a unit,
    a third transmission bar and
    a third driven bar, said third driven bar being mounted such that it swivels about said secondary axis and being connected to said secondary shaft to drive said secondary shaft in an alternating manner, and in that in a starting position of said windscreen wiper, said third driving bar and said third transmission bar are arranged forming a fourth angle (θ3) comprised between −5° and +20° with respect to one another.

5. The windscreen wiper device according to claim 4, characterized in that in said starting position of said windscreen wiper, said third driving bar and said third transmission bar are arranged forming a fourth angle (θ3) comprised between −5° and +10° with respect to one another.

6. The windscreen wiper device ROM according to claim 4, characterized in that said second angle (θ1) between the second driving bar and said first driven bar is comprised between 35° and 55°, and said third angle (θ2) between said third driving bar and said second driven bar is comprised between 55° and 75°.

7. The windscreen wiper device ROM according to claim 4, characterized in that said first four-bar linkage is a crank-rocker mechanism and said second and third four-bar linkages are double mechanisms.

8. The windscreen wiper device according to claim 4, characterized in that a length ratio
    between said second driving bar and said second transmission bar is comprised between 0.5 and 0.7,
    between said second driving bar and said second driven bar is comprised between 1.1 and 1.3, and
    between said second driving bar and the distance between said primary axis and said swivel axis is comprised between 1.1 and 1.3,
    whereas a length ratio between:
    said third driving bar and said third transmission bar is comprised between 0.4 and 0.6, and
    between said second driving bar and said second driven bar is comprised between 0.7 and 0.9,
    between said second driving bar and the distance between said swivel axis and said secondary axis is comprised between 0.6 and 0.8.

9. The windscreen wiper device according to claim 1, characterized in that said primary axis and said secondary axis are coplanar.

10. The windscreen wiper device according to claim 1, characterized in that said primary axis is inclined with respect to said secondary axis forming said first acute angle (β) with respect to one another, said first acute angle (θ) being comprised between 12° and 32°.

11. The windscreen wiper device according to claim 1, characterized in that when said primary shaft has performed 50% of the rotation between said starting primary position and said final primary position, said secondary shaft has performed between 5% and 23% of the rotation between said starting secondary position and said final secondary position, and characterized in that when said primary shaft has performed 75% of the rotation between said starting primary position and said final primary position, said secondary shaft has performed 65% of the rotation between said starting secondary position and said final secondary position.

* * * * *